United States Patent [19]

Stringer

[11] Patent Number: 4,785,416
[45] Date of Patent: Nov. 15, 1988

[54] MICROPROCESSOR TIMING EMULATOR HAVING A "WAIT" STATE

[76] Inventor: Philip J. Stringer, 170 Brox Road, Ottershow, Chertsey, Surrey, England

[21] Appl. No.: 24,857

[22] Filed: Mar. 16, 1987

Related U.S. Application Data

[63] Continuation of Ser. No. 619,022, Jun. 11, 1984, abandoned.

[30] Foreign Application Priority Data

Jan. 6, 1984 [GB] United Kingdom ............... 8413933

[51] Int. Cl.[4] ........................................... G06F 9/44
[52] U.S. Cl. .............................. 364/200; 371/20; 371/27
[58] Field of Search ... 364/200 MS File, 900 MS File

[56] References Cited

U.S. PATENT DOCUMENTS

| | | | |
|---|---|---|---|
| 3,974,484 | 8/1976 | Stringer et al. | 364/900 |
| 3,976,864 | 8/1976 | Gordon et al. | 235/153 |
| 4,183,459 | 1/1980 | Donn | 235/302 |
| 4,192,513 | 3/1980 | Swerling et al. | 371/20 |
| 4,216,374 | 8/1980 | Lam et al. | 371/27 |
| 4,447,876 | 5/1984 | Stringer | 364/200 |
| 4,450,521 | 5/1984 | McDonough et al. | 364/200 |
| 4,453,211 | 6/1984 | Askinazi et al. | 364/200 |
| 4,519,033 | 5/1985 | Vaughn et al. | 364/200 |
| 4,558,411 | 12/1985 | Faber et al. | 364/200 |
| 4,574,354 | 3/1986 | Mihalik et al. | 364/481 |
| 4,674,089 | 6/1987 | Poret et al. | 371/25 |

OTHER PUBLICATIONS

A portion of the technical manuals for the Fluke Model 9010A Digital Test Unit.

A portion of an article appearing in "Electronics", dated Apr. 21, 1981.

A portion of a user's Manual for the Terradyne L210 Test Unit.

*Primary Examiner*—Gary V. Harkcom
*Assistant Examiner*—Randy W. Lacasse
*Attorney, Agent, or Firm*—Arnold, White & Durkee

[57] ABSTRACT

Within a test system for testing microprocessor-based systems, an apparatus for emulating the timing characteristics of a microprocessor, including when the microprocessor goes to a "WAIT" state during the execution of an instruction cycle. A control signal RAM has a plurality of sets of instructions, each set being stored in a specific region, each set corresponding to the timing characteristics, that is the control, address and data signals, of a microprocessor. A decode RAM stores coded instructions for addressing each region of the control signal RAM. A sequence control RAM contains data for addressing each address location in the region of the control signal RAM selected by a signal input to the decode RAM. In response to the combination of a clock signal and an external ready input signal, a sequence control latch supplies address signals to the control signal RAM to access a particular instruction of the selected instruction set and supplies the same signals to the address inputs of the sequence control memory. The sequence control memory then latches the address signals for the next instruction in the sequence control latch. The control signal memory stores data for producing a "WAIT" output. A change in the external ready input signal suspends the instruction address sequencing and causes the control signal memory to produce the "WAIT" output.

16 Claims, 4 Drawing Sheets

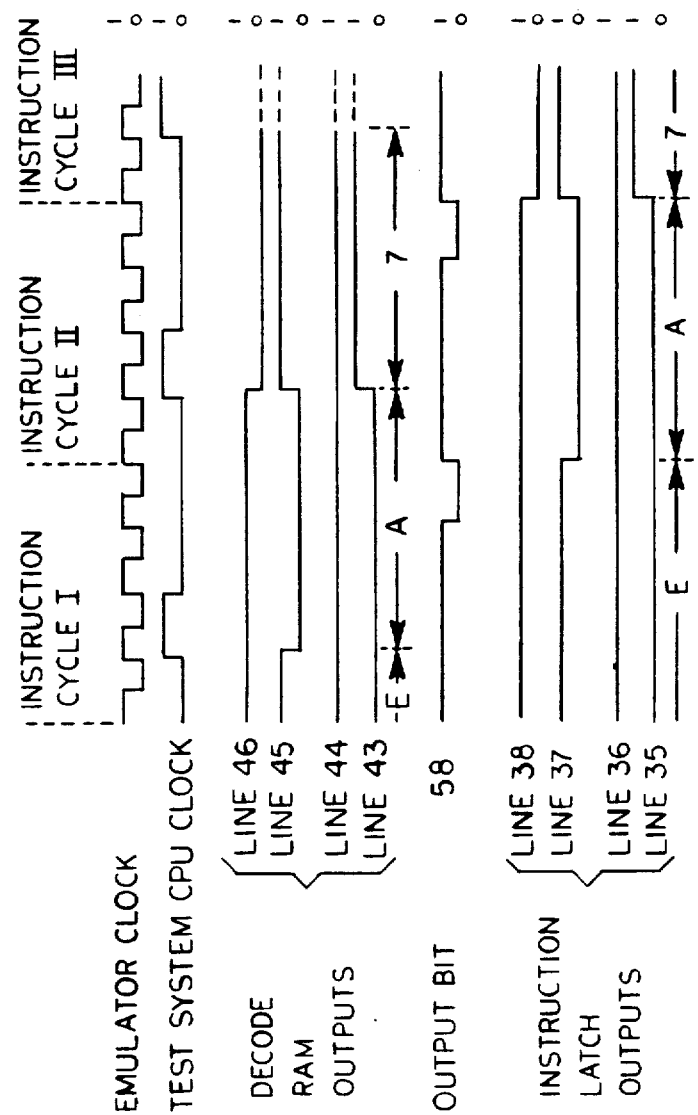

MICROPROCESSOR TIMING EMULATOR HAVING A "WAIT" STATE

This is a continuation of co-pending application Ser. No. 619,022, filed on June 11, 1984, now abandoned.

This invention relates to apparatus for emulating the timing characteristics of a microprocessor.

It should be understood that, as used herein, the phrase 'timing characteristics of a microprocessor' refers to the control, address and/or data signals of a microprocessor. Although, the apparatus will normally be used to emulate all of these microprocessor signals, it should be understood that the apparatus may be used to emulate only one or two of the different types of signals of a microprocessor.

With the increasing use and complexity of Large Scale Integrated (LSI) and Very Large Scale Integrated (VLSI) circuit boards, it has become even more crucial that such boards be thoroughly tested. Microprocessors are continuously being used in new applications to control or monitor devices or parameters which heretofore had been controlled or monitored either manually, mechanically, or by use of analogue devices. These new applications have resulted in a parallel increase in the diversity of types of special and general purpose microprocessor-based systems.

Some devices are known for testing such microprocessor-based systems by emulating their timing characteristics. However, such test equipment generally is only capable of fully emulating the timing characteristics of one specific type of microprocessor or, at best, a limited range of microprocessor types. Many microprocessor test devices are capable of emulating some, but not all, of a particular microprocessor's timing characteristics. Thus, it is apparent that there is a need for a device which is capable of emulating all of, or at least a majority of, the timing characteristics of a wide variety of microprocessors.

As LSI and VLSI circuits become more complex, the use of more than one microprocessor in a circuit is increasingly common. To test such circuits, it is necessary to emulate the timing characteristics of all of its microprocessors. However, prior art testing devices typically are able to emulate the timing characteristics of some—but not all—of such microprocessors. This is inefficient and tedious since multiple testing units are required and they must be interchanged when another microprocessor in the circuit board is to be tested.

In order to test a microprocessor fully, it is desirable to test the response of the unit under test when the microprocessor goes to a "WAIT" state during the execution of an instruction cycle. However, in that event the emulator may "forget" which instruction cycle was being executed when it was stopped by the receipt of the "WAIT" signal, and may not be able to finish execution of that instruction cycle.

According to one aspect of the present invention there is provided apparatus for emulating the timing characteristics of a microprocessor, the apparatus comprising: a control signal memory storing data representing a plurality of sets of instructions, each instruction set being stored in a respective region of the said control signal memory and each instruction set comprising a plurality of instructions; a decode memory for receiving a signal specifying a given instruction set to be used for emulating the timing characteristics of a selected microprocessor and for supplying, in response to the instruction set specifying signal, address signals to the control signal memory to select the region of the control signal memory storing the given instruction set; a sequence control memory for supplying, in response to the instruction set specifying signal, address signals to select one instruction in the given instruction set, a sequence control latch for supplying the selected instruction address signals to the control signal memory; and means for supplying a clock signal to the sequence control latch to actuate the sequence control latch to supply the address signals to the control signal memory so that, in use, the instructions of the instruction set are supplied to emulate the timing characteristics of a microprocessor in a sequence determined by the sequence control memory.

In a second aspect the present invention provides apparatus for emulating the timing characteristics of a microprocessor, the apparatus comprising: a control signal RAM storing data representing a plurality of instruction cycles and having multiple upper address inputs for specifying one of the plurality of instruction cycles and having multiple lower address inputs for specifying an instruction in each cycle; a decode RAM for receiving coded instructions and for decoding the coded instructions to provide the multiple upper address inputs to the control signal RAM; a sequence control having RAM multiple outputs for producing multiple lower address inputs for the control signal RAM; and a sequence control latch connected to receive the outputs of the sequence control RAM, the outputs of the latch being connected as the lower address inputs to said control signal RAM, whereby a clock connected to the latch causes the sequence control latch to produce a lower address sequencing of the cycle determined by said upper address inputs by causing outputs to be produced from the sequence control RAM and then later to be produced from the sequence control latch to further sequence the sequence control RAM.

In a preferred embodiment the apparatus or emulator is provided in test equipment for microprocessor-based systems for generating a number of signals suitable to emulate the timing characteristics for testing of a wide variety of microprocessors. Before testing begins, a control signal random access memory (RAM) is loaded by a central processing unit (CPU) of the test system with data corresponding to the control, data and address signal inputs to a microprocessor unit under test (UUT). A decode RAM is initially loaded with coded instructions which define the region of the control signal RAM storing each set of instructions for emulating the timing characteristics of a microprocessor corresponding to the instruction steps or sequences of the instruction cycle to be executed. When testing of a microprocessor is begun, the decode RAM sends its instruction cycle selecting information to the multiple, upper address inputs of the control signal RAM to select the region of the control signal RAM storing the required instruction cycle while the sequence control RAM outputs its instruction sequence data to a sequence control latch. In response to a clock signal, this latch addresses the lower multiple address inputs of the control signal RAM to cause address locations in the selected region of the control signal RAM to be used in a predetermined sequence so that the instructions of the selected instruction set are accessed in a predetermined sequence and the emulator outputs signals corresponding to the timing characteristics of the microprocessor unit under test.

A preferred embodiment of the invention comprises an emulator which is capable of emulating the timing characteristics of all, or at least more than one, of the microprocessors in a typical circuit board. The preferred embodiment may store the current instruction cycle information so that its execution may be completed even if interrupted on receipt of a "WAIT" signal. The preferred emulator uses parallel data transmission to provide for high speed in outputting the emulated timing characteristic.

For a better understanding of the present invention, and to show how the same may be put into effect, reference will now be made, by way of example, to the accompanying drawings, in which:

FIGS. 2A and 2B represent timing diagrams illustrating the outputs of various parts of the emulator of FIG. 1 cycles.

Figure 1:
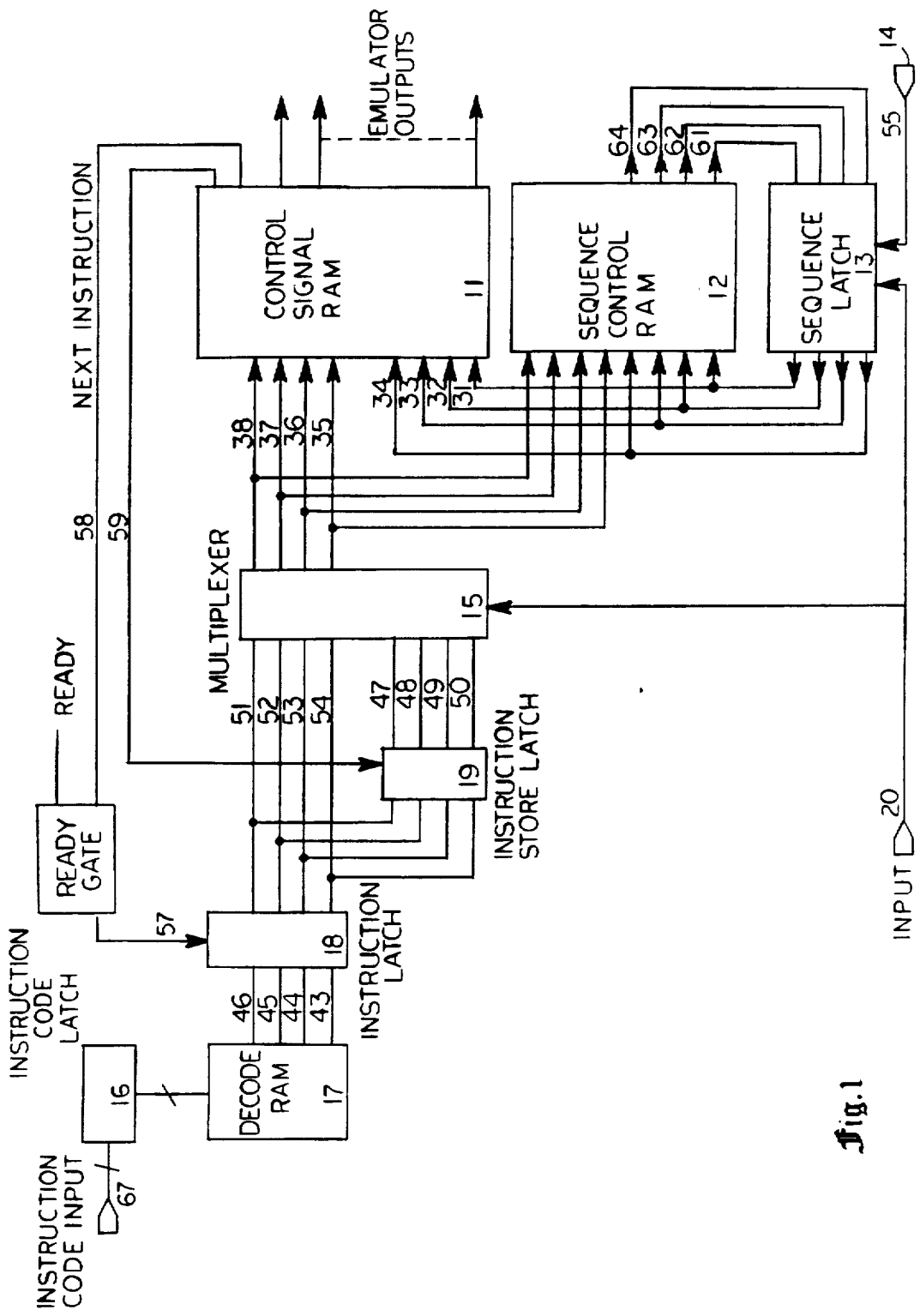
FIG. 1 is a functional block diagram of an emulator in accordance with the present invention.
Figure 3:
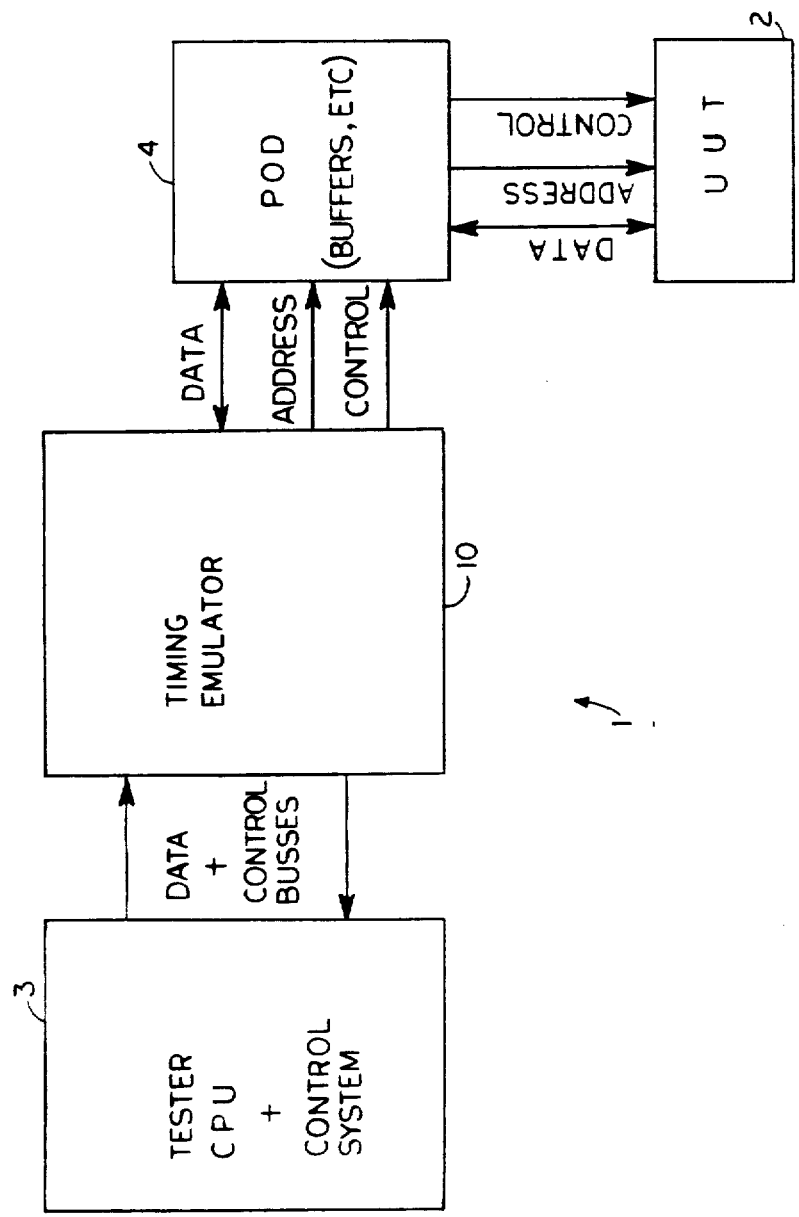
FIG. 3 is a schematic block diagram of a test system incorporating the emulator of FIG. 1.

Referring now to the drawings, FIG. 1 shows an emulator in accordance with the present invention. The emulator 10 is a portion of a test system (FIG. 3) for testing a wide variety of microprocessors and is provided to emulate the timing characteristics, that is, the control data and address signals which are normally input to a microprocessor unit (UUT) 2 to be tested. The emulator is controlled by signals from a central processing unit (CPU) 3 of the test system 1 and is connnected via a "Pod" 4, which provides signal buffering etc., to the UUT 2. Initially, the emulator is preprogrammed by the CPU 3 with timing characteristics data for the microprocessor of the UUT 2. After the data has been loaded into the emulator, the CPU 3 can call up a complete instruction cycle from the emulator by means of a single command and the emulator will generate the appropriate sequence of timing characteristic signals in parallel bit paths to emulate that particular cycle of the microprocessor of the UUT 2. In addition, the Pod 4 acts as a buffer for signals on data and address buses that pass between the emulator 10 and the UUT2. The Pod 4 also generates some testing system control and timing signals.

Referring now to FIG. 1, the data to generate the appropriate control, data and address signals for the microprocessor of the UUT are stored in control signal random access memory (RAM) 11 which has a capacity of 256 28-bit words. The control signal RAM 11 output signals are generated in parallel bit paths by addressing a sequence of locations in RAM 11 in turn, once every cycle of a clock 14 of the emulator. Up to 16 types of instruction cycles may be stored in the control signal RAM 11. Each of the stored cycles is allocated up to 16 address locations in the RAM 11, one for each different step or sequence in the instruction cycle. An instruction cycle need not, of course, use all 16 of the stored instruction steps. The address locations of control signal RAM 11 addressed during testing of the microprocessor of the UUT are normally determined both by the contents of an instruction decode RAM 17 and a sequence control RAM 12. The instruction decode RAM 17 has a capacity of 256 8-bit words and each 8-bit word contains four bits identifying the group of addresses for an instruction cycle plus four other bits which are used by the control logic (not shown) of the emulator. Thus, the instruction decode RAM 17 provides the four most significant or upper address bits of an 8-bit address of the control signal RAM 11, so that the output of the decode RAM 17 selects the address locations in the control signal RAM 11 storing a particular instruction cycle. The sequence control RAM 12 supplies the four least significant or lower address bits to the control signal RAM 11 via lines 31 to 34, so as to control the sequence in which each address of the group of addresses containing a given instruction cycle is accessed and thereby control the sequence of instructions supplied to the microprocessor of the UUT 2.

It should, of course, be appreciated that the instruction decode RAM 17 serves to enable the type of instruction cycle selected by a given instruction code sent by the CPU 3 to be determined by the data stored in the instruction decode RAM 17. This gives the flexibility to, for example, allow the test system to use the same pre-programmed test routines with different microprocessors.

As described above, before testing of the UUT 2 begins, the control signal RAM 11 the sequence control RAM 12 and the instruction decode RAM 17 are loaded with data by the test system's CPU 3. The location or address of the respective RAM in which the data is to be stored is supplied by the output of the system's CPU 3. Thus the CPU 3 causes the appropriate enable signal to be generated to enable data to be stored in the appropriate emulator RAM. This process continues until the CPU 3 has loaded all of the necessary instructions or data into the control signal RAM 11, sequence control RAM 12, and decode RAM 17. The test system's CPU 3 may then verify the data stored in RAM 11, RAM 12 and RAM 17 in a conventional manner.

When the microprocessor of the UUT 2 is to be tested, the instruction decode RAM 17 is addressed by CPU 3 of the test system and data is output from decode RAM 17 via lines 43 to 46. This data supplies the four most significant or upper multiple address bits of the region of the RAM 11 containing the required instruction cycle. These four most significant bits are latched in an instruction latch 18 and sent in parallel lines 51 to 54 to a multiplexer 15. When the appropriate ready signal is sent via ready input line 20, the instruction latch 18 sends these four most significant bits to the multiplexer 15 which sends the four most significant or upper address bits to the control signal RAM 11 via parallel lines 35 to 38. These four most significant or uppe address bits determine the region of memory of the control signal RAM 11 which is to be accessed thereby determining the instruction cycle to be used. Thus, the upper address bits determine which instruction cycle is to be emulated by the outputs of the control signal RAM 11.

The four least significant or lower multiple address bits of each address of the control signal RAM 11 determine the next step or sequencing of the instruction cycle selected by the four most significant or upper multiple address bits supplied to the RAM 11. The lower address bits are normally supplied to the control signal RAM from the sequence control RAM 12 via a sequence control latch 13 and parallel lines 31 to 34. These lower address bits are supplied from the sequence latch 13 upon receipt thereby of a signal from the emulator clock 14 sent via line 55. The clock signal emanating from the emulator clock 14 may be picked up by the Pod 4 from the UUT 3, so that the sequencing or timing of each emulated instruction cycle corresponds to that of the UUT microprocessor.

As will be appreciated, the sequence in which the instructions of an instruction cycle of the UUT microprocessor are emulated is determined by the sequence in which the 8-bit addresses are supplied to the control signal RAM 11. Thus, the sequence in which the instructions are emulated is determined by how the hexadecimal number represented by the lower four bits of the 8-bit address changes. At the beginning of each instruction cycle, the lower four address bits are preferably each set so that they represent the hexadecimal number F. Of course, this setting of the lower four bits is arbitary and the sequence could, for example, start with the lower four address bits set at logical zero. In the preferred arrangement, the lower four address bits are each initially set to logical "1" because of the end of the previous instruction cycle, the sequence control RAM 12 output bits channelled to the control signal RAM 11 via lines 31 to 34 are each always logical "1" (hexadecimal F.).

At the beginning of each instruction cycle, the lower four address bits representing hexadecimal E are sent from the sequence control RAM 12 to the sequence latch 13. Upon receipt by the sequence latch 13 of an emulator clock signal on line 55 from the emulator clock 14, the said lower four address bits representing hexadecimal E are supplied from the sequence latch 13 to the control signal RAM 11 on lines 31 to 34 and also are input as address signals to the sequence control RAM 12, the data being so stored in the sequence control RAM 12 that the data stored in that address location thereof represents a hexadecimal number represnting the address locaton of the next data. That is to say, when the four address bits representing hexadecimal F are supplied to the sequence control RAM 12, the RAM 12 outputs to the latch 13 four bits representing hexadecimal E, that is the address in the control signal RAM 11 storing the next instruction. The above process is repeated until the instruction cycle is completed, that is, when the four address bits representing the last step have been supplied to the control signal RAM 11 on lines 31 to 34 to select the last instruction step and also to the address inputs of the sequence control RAM which then supplies four bits representing hexadecimal F to the sequence latch 13 ready for the next instruction cycle. Therefore, at each step, the control signal RAM 11 address is decremented until the instruction cycle is complete. When the RAM 12 address corresponding to the end of the cycle is reached, the contents of RAM 12 locations corresponding to hexadecimal F are addressed. This sets the least significant of lower address bits to the first step of the next instruction to be executed.

It should, of course, be appreciated, that the lower address data may be stored in the sequence control RAM 12 in any desired order so that the outputs of the sequence control RAM 12 do not, necessarily, count down from hexadecimal F or up from zero but output the lower address signals in any desired sequence which will, of course, be determined by the relationship between the data stored in the sequence control RAM and the addresses thereof.

Output bit 58 of the control signal RAM 11 is used to indicate the occurence of the last step of the instruction cycle being executed. Thus, at every step of an instruction cycle, this bit is at logical "1", except for the last step, when it goes to 0. When this bit goes to 0 a next instruction signal 57, at the following clock cycle, is supplied to instruction latch 18 which latches the address in the decode RAM 17 corresponding to the next instruction cycle. This causes the next instruction cycle to begin execution. One clock cycle later, a clock signal is supplied to the CPU of the test system which then places the instruction code for the next instruction cycle type on command bus 67 so that the next instruction cycle is ready to be latched into instruction latch 18 just before the current instruction has been completely executed.

Figure 2B:
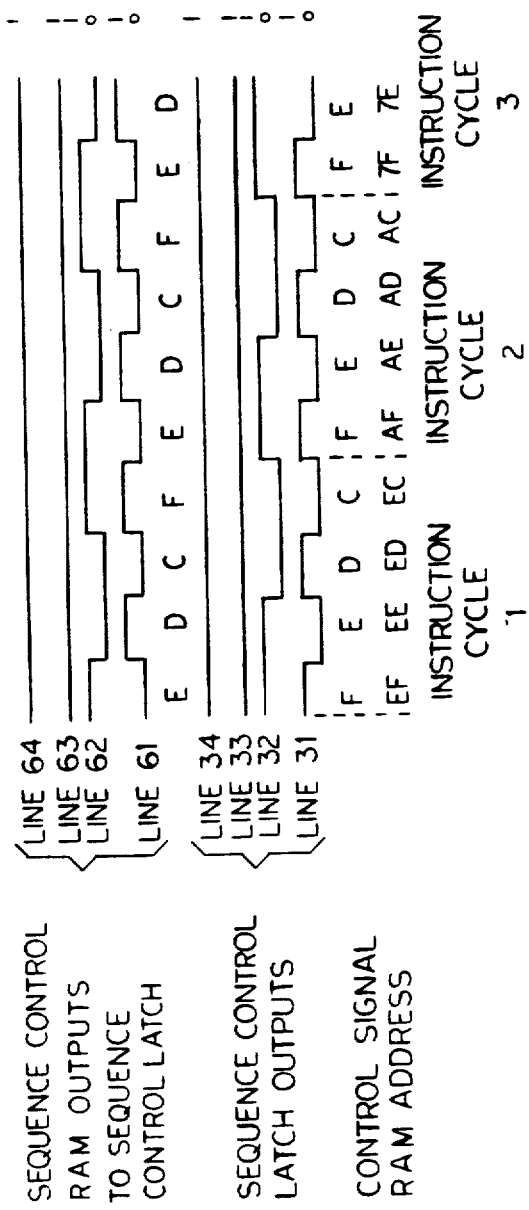

FIG. 2 is timing diagram illustrating the states of the outputs of various parts of the emulator for three different instruction cycles. Each instruction cycle I, II, III has four steps, the first instruction cycle being stored in address locations EF to EC, the second instruction cycle being stored in address locations AF to AC and the third instruction cycle being stored in address locations 7F to 7C of the control signal RAM. In particular, the outputs of the decode RAM 17, the instruction latch 18, the sequence control RAM 12 and the sequence control latch 13 are shown for the three instruction cycles, the hexidecimal address number represented by the outputs being given in FIG. 2. It will be understood that the instruction cycle I has upper bits E and lower address bits F to C. Similarly the instruction cycles II and III each have lower address bits F to C and upper address bits A and 7 respectively.

It is also possible to emulate the quiescent mode of the UUT microprocessor by latching a special instruction or "zero" cycle into the instruction latch 18. The upper address bits or control bits corresponding to this zero cycle are input to the control signal RAM 11 via lines 35 to 38 and the emulator 10 will perform this instruction cycle unless it receives a command to perform another. In this case, the outputs of sequence control RAM 12 on lines 61 to 64 which are supplied via the sequence latch 13 and lines 31 to 34 to the control signal RAM 11 represent hexadecimal F, the area of the RAM 11 being accessed having the address OF. This corresponds to the beginning of a cycle. Thus, unless a new instruction address is received by RAM 11 this address is cycled continuously. The RAM 11 output bits at this location are such that they can provide quiescent state control signals to the UUT microprosessor or any other required control signals.

Similarly, it is also possible to emulate the timing characteristics of the UUT microprocessor when it is in a "wait" condition. In order to do so, operation of the emulator 10 may be halted during an instruction cycle when the "wait" signal is received by sequence latch 13 via ready input line 20. After receipt of a "wait" signal, the emulator 10 will output control signals corresponding to the "wait" state of the UUT microprocessor and will continue to do so until it receives a "ready" signal (wait=not ready).

UUT microprocessors are typically designed to sense the ready line one step before the final one in an instruction cycle. However, because the Pod 4 is running one clock cycle or step behind the emulator 10, the address of the next instruction is already latched into instruction latch 18 when the "wait" signal is received. In order to prevent emulator 10 from "forgetting" the correct instruction cycle so that the current instruction cycle may be completed when a "ready" signal is received, the emulator 10 is designed so that the upper address bits of the current address cycle which are supplied to the control signal RAM 11 are also supplied via lines 51 to 54 to an instruction store latch 19 so that the upper address bits for the next instruction cycle may be stored in the instruction latch 18. Thus on receipt of a 'wait' signal from the microprocessor under test, the current instruction cycle upper address bits which would otherwise be lost are available in the instruction store latch 19. The instruction store latch 19 is clocked at the beginning of each instruction cycle by the signal on line 59 of the control signal RAM 11. On receipt by the emulator of a 'Ready' signal the data stored in instruction store latch 19 is output via the multiplexer. When the current instruction cycle is completed and assuming that a "wait" signal is not received, the next instruction is taken from instruction latch 18 and executed as usual.

As stated above, the CPU 3 calls up the selected instruction cycle. However, variations on the selected instruction cycle may be specified by generating special control signals. For example, one such special control signal may cause the microprocessor of the UUT 2 to undergo a static test as opposed to the above-described dynamic test. Static testing may be accomplished by initially loading the sequence control RAM 12 with data so that the data stored in one address of RAM 12 is the address of data which itself represents the one address so that the sequence latch 13 alternates continuously between two addresses of the control signal RAM 12, which addresses have identical control signal RAM outputs. This causes the control signal RAM 11 to repeatedly output the same signals to the UUT 2 and thus, the static testing is achieved.

Where a circuit has more than one microprocessor to be tested, multiple emulators in accordance with the present invention may be connected to a single instruction code input but (not shown). Alternatively, a single emulator may be used to emulate the timing characteristics, that is the control data and address signals of each of the microprocessors, one at a time. In either case, an instruction code latch 16 loads the appropriate instruction code for a selected microprocessor in the UUT circuit in response to the test system's CPU 3. The outputs from the emulators not being used are frozen until the emulator being used to test the selected UUT microprocessor has completed its instruction cycles. Emulation of the timing characteristics of the next selected UUT microprocessor then proceeds as described above.

Preferably, the timing or clock signals of the emulator 10 are derived from the emulator clock 14, which in turn is derived from the clock of the UUT microprocessor. Under some circumstances, it may be desirable to use a programmable clock (not shown) to provide an alternative timing source for the emulator. The period of the programmable clock is determined by the contents of four of the output bits of control signal RAM 11 which are loaded into the programmable clock at the end of every clock cycle. This allows the period of each cycle to be individually controlled. The selected programmable clock signal is fed back to the Pod 4 to maintain synchronization with the emulator.

The emulator described herein may be operated only when it has been enabled by the test system CPU 3. Preferably, each printed circuit board in the entire test system is allocated a unique address and, to enable emulator 10, the test system CPU3 places the address of the emulator 10 on a microdatabus, then loads it into Card Select Logic (not shown). If the address is valid, the Card Select Logic generates a signal and its inverse to enable a number of circuits in the emulator 10. When emulator 10 is not enabled, the upper address of control signal RAM 11 is forced to the "0" or zero cycle as described above. This results in emulator 10 outputting signals corresponding to the quiescent state of the UUT2.

Control, address and data signals may thus be generated to emulate the timing characteristics of a wide variety of microprocessors including the UUT's quiescent state, using a single emulator. Moreover for circuits having more than one microprocessor, the timing characteristics of each microprocessor can be sequentially emulated. Also the execution of an instruction cycle for testing of a microprocessor can be halted at any time, and execution of the same instruction cycle may be resumed at a later time and, as described above, static as well as dynamic testing of microprocessors can be carried out. Further, the speed of the emulator can be increased relative to previous emulators by using parallel bit paths to transmit data and control signals to the microprocessor UUT.

I claim:

1. Apparatus for emulating the timing characteristics of a microprocessor, the apparatus comprising:
    (a) a control signal memory storing data representing a plurality of sets of instructions, each instruction set being stored in a respective region of the said control signal memory and each instruction set comprising a plurality of instructions;
    (b) a decode memory for receiving a signal specifying a given instruction set to be used for emulating the timing characteristics of a selected microprocessor and for supplying, in response to the instruction set specifying signal, first address signals to the control signal memory to select the region of the control signal memory storing the given instruction set;
    (c) a sequence control memory for supplying, in response to the instruction set specifying signal, second address signals to select one instruction in the given instruction set;
    (d) a sequence control latch for supplying the second address signals to the control signal memory; and
    (e) means for supplying a clock signal to the sequence control latch to actuate the sequence control latch to supply the second address signals to the control signal memory, wherein the control signal memory stores data for producing a WAIT output and wherein the sequence control latch supplies the second address signals to the control signal memory only in response to an external ready input signal, and wherein a change in the ready input signal suspends the supplying of the second address signals by the sequence control latch and causes the control signal memory to produce the WAIT output, so that, in use, the instructions of the instruction set are supplied to emulate the timing characteristics of a microprocessor in a sequence determined by the sequence control memory.

2. Apparatus for emulating the timing characteristics of a microprocessor, the apparatus comprising:
    (a) a control signal RAM storing data representing a plurality of instruction cycles and having multiple upper address inputs for specifying one of the plurality of instruction cycles and having multiple lower addresses for specifying an instruction in each cycle;
    (b) a decode RAM for receiving coded instructions and for decoding the coded instructions to provide the multiple upper address inputs to the control signal RAM;

(c) a sequence control RAM for receiving the coded instructions and for supplying, in response to the coded instructions, multiple lower address outputs; and (d) a sequence control latch connected to receive the multiple lower address outputs of the sequence control RAM, the outputs of the latch being connected as the lower address inputs to said control signal RAM, whereby a clock connected to the latch causes the sequence control latch to produce a lower address sequencing of the cycle determined by said upper address inputs by causing outputs to be produced from the sequence control RAM and then later to be produced from the sequence control latch to further sequence the sequence control RAM, wherein the control signal RAM stores data for producing a WAIT output and wherein the sequence control latch produces the lower address sequencing only in response to an external ready input signal, so that a change in the ready input signal suspends the lower address sequencing and causes the control signal RAM to produce the WAIT output.

3. Apparatus according to claim 1 or 2, wherein the clock operates in real time.

4. Apparatus according to claim 3 wherein the clock signal is supplied via a clock of a microprocessor whose timing characteristics are to be emulated.

5. Apparatus according to claim 4 wherein the clock signal is programmable.

6. Apparatus according to claim 3 wherein the clock signal is programmable.

7. Apparatus according to claim 1 or 2, wherein the clock signal is programmable.

8. Apparatus according to claim 1, wherein another change in the ready input signal causes resumption of the instruction address sequencing from the point of suspension thereof.

9. Apparatus according to claim 7, further including a multiplexer for supplying address signals from the decode memory to the control signal memory.

10. Apparatus according to claim 8, wherein an instruction store latch is provided to store address signals from the decode memory until receipt of a clock signal from the control signal memory.

11. Apparatus according to claim 7, wherein an instruction latch is provided for supplying address signals from the decode memory to the control signal memory in response to a ready signal input to the instruction latch.

12. Apparatus according to claim 11, wherein an instruction store latch is provided to store address signals from the decode memory until receipt of a clock signal from the control signal memory.

13. Apparatus according to claims 1 or 2, wherein the control signal memory stores identical data at two distinct address locations and data is so stored in the sequence control memory that, in use, the sequence control latch supplies, in sequence, address signals which address two distinct address locations of the control signal memory when the decode memory supplies address signals to select the region of the control memory containing the two said address locations so that static testing is achieved.

14. Apparatus according to claim 13 wherein the control signal memory stores data for emulating a quiescent state of a microprocessor and wherein the decode memory is arranged to receive and decode a coded instruction which causes the control signal memory to output the said data.

15. Apparatus according to claim 13, wherein an Instruction Code Latch is provided to receive external instructions and to output the same to the decode memory in response to a control signal.

16. Apparatus according to claims 1 or 2 wherein the control signal memory stores sets of instructions for emulating the timing characteristics of a plurality of microprocessors.

* * * * *